March 25, 1958 — T. M. ROSS — 2,827,664
WAX SLABBING MACHINE
Filed Oct. 8, 1952
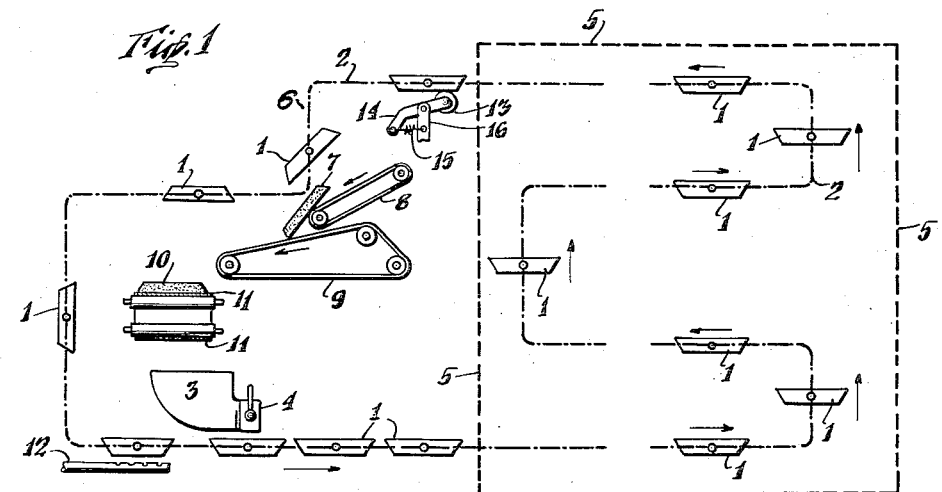
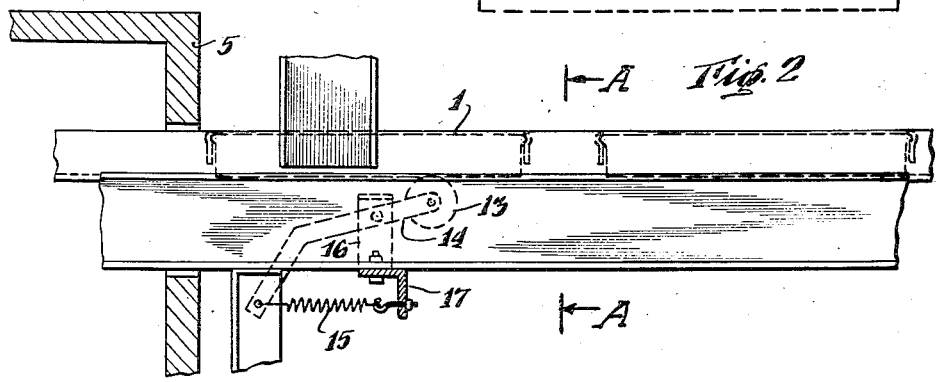
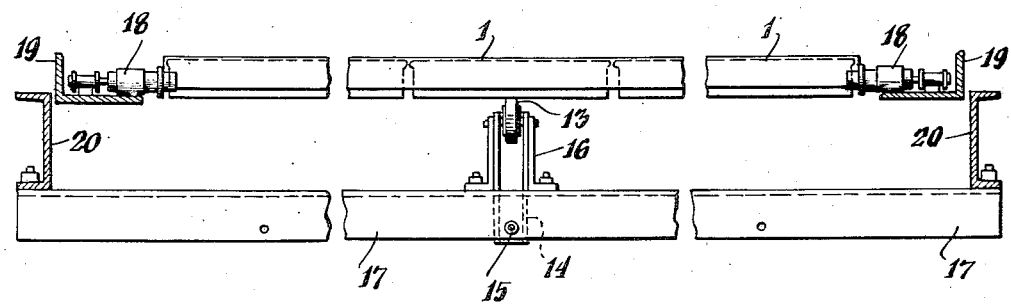
INVENTOR.
Thomas M. Ross
BY
ATTORNEY

United States Patent Office 2,827,664
Patented Mar. 25, 1958

2,827,664
WAX SLABBING MACHINE

Thomas M. Ross, Beaumont, Tex., assignor to Socony Mobil Oil Company, Inc., a corporation of New York Application October 8, 1952, Serial No. 313,702

2 Claims. (Cl. 18—26)

This invention has to do with improvements in a machine for the continuous slabbing of paraffin and microcrystalline waxes derived from petroleum.

As set forth in application Serial Number 254,682 of Leon H. Jennings, filed November 3, 1951, for Method of Casting Wax Slabs, now United States Patent Number 2,677,151, a certain machine formerly used for the casting of slabs of chocolate and the like, has been utilized in the production of wax in slab form by a process of continuous molding.

This invention has to do with an improvement in that machine to facilitate the dumping of the slabs when formed.

This invention is best understood by reference to the drawings which are attached to and form a part of this specification.

In these drawings, Figure 1 is a diagrammatic showing of the entire machine, while Figures 2 and 3 are respectively side view and section view of the particular improvement here disclosed.

In Figures 1, a series of pans 1, 1, 1, etc., are carried upon a chain 2, 2, 2, etc. These pans are of the proper size for the desired wax slabs, and are closely spaced upon the side chains and arranged in transverse gangs of six pans, side by side. At the left hand end of the lowest pass of the chain, they pass under a depositor, consisting of a hopper 3 and a transverse series of piston type feeders 4, whereby a measured amount of molten wax is withdrawn from hopper 3 and deposited in each pan. Passing to the right, the pans enter into a cooled enclosure designated by dotted lines 5, wherein they are blasted with cooling air to bring about solidification of the wax. The pans are led through a series of horizontal passes in the cooler (14 passes in one installation), only four being shown in the diagram for purposes of simplicity. The chain and conveyor system is so arranged that the pans remain in an upright and horizontal position, without disturbance of the wax enough to cause distortion of the cake surface, while passing through the cooler. The cooler is fed with cold air, supplied from cooling coils located at one side of the cooler enclosure and blown transversely therethrough.

Emerging from the cooler 5, at the upper left hand end in the diagram, the pans are passed through an upsetting turn and put into an upside down position in the chain pass indicated by 6. This upsetting results in the dropping of the wax slab 7 which through the agency of conveyors 8 and 9, associated with the upsetting or discharge mechanism, is finally placed in position on discharge conveyor 11 by which it is withdrawn laterally from the slabbing machine. The pans 1 are then righted, and prior to loading by distributor 4 are passed over a preheater 12 which heats the pans slightly before they are filled.

Now, in operation of this machine an occasional cake or slab of wax sticks in the pan, and does not drop when the pan is upset. Even if this occurs only once in several hundred slabs, it causes shutdown and lost time. To avoid this, the machine as installed makes use of a knocker, to ensure dislodging of all slabs when the pans are upturned. The knocker is elevated and allowed to fall on the supporting lugs of the frame that retains the pans. This mechanism was noisy, and gave rise to undesirably high maintenance to the frames that retain the pans.

To avoid this difficulty I have devised a spring biased wheel 13, mounted on a lever arm 14, with biasing spring 15 all on post 16 so affixed to the frame of the machine as to flex the bottom of the pan upwardly just before it enters the overturning pass of the slab casting machine. I have found that a slight but positive upward flexure of the pan bottom at this point ensures complete dumping.

Turning to Figures 2 and 3 there are shown details of the installation. In Figure 2 there are shown pans 1, 1, as they pass from the moulding machine indicated at 5. Beneath the pans, as they emerge from the machine, there is found wheel 13, mounted on lever arm 14, biased by spring 15, the assembly being carried by a support formed of post 16 and angle iron base 17. (Details of mechanism and supports other than angle iron 17 are omitted for simplicity.)

In Figure 3, which is a view taken at this point and in the direction indicated at A—A in Figure 2, there is shown a bank of six pans 1—1, supported upon their conveyor mechanism 18, 18 which in turn is supported by side rails 19, 19. To side frame members 20, 20 there is fastened an angle iron 17 which in turn supports a flexing wheel mounted under each pan path. In detail, the flexing wheels 13 are supported in a stirrup shaped lever arm piece 14, which is spring biased by a spring 15, and pivoted upon two post pieces 16—16. The construction for each flexing wheel is the same.

These wheels are so mounted that when the pan passes over them, constrained by the conveying mechanism, the wheels flex the pan bottom upward slightly and with enough motion of the pan bottom relative to the pan side walls to ensure that the wax cake is freed. The relative motion necessary is quite small, but must be positive.

I claim:

1. In a slabbing machine wherein wax and the like are cast in slabs by pouring into pans which pans are conveyed through a chilling zone to solidify the slab and then turned from the horizontal to discharge the slab therefrom the improvement comprising pressure means over which the pan bottom must pass, located prior to and adjacent to the slab dumping opeartion, said pressure means being adjusted to positively flex the centre of the pan bottom upwardly and differentially with respect to the sidewalls of the pan while the said sidewalls are maintained in position and alignment by the pan conveying mechanism.

2. The apparatus of claim 1 in which the pressure means includes a wheel, a lever arm upon which said wheel is mounted, and a spring acting through said lever arm to force the wheel into engagement with the pan bottom as the pan passes thereover.

References Cited in the file of this patent
UNITED STATES PATENTS

| Number | Name | Date |
|---|---|---|
| 1,399,485 | Johnson | Dec. 6, 1921 |
| 1,983,602 | Daubenmeyer | Dec. 11, 1934 |
| 2,026,214 | Chilton | Dec. 31, 1935 |
| 2,345,206 | Mallard | Mar. 28, 1944 |
| 2,429,882 | Jennings | Oct. 28, 1947 |
| 2,431,916 | Caesar | Dec. 2, 1947 |
| 2,614,309 | Price | Oct. 21, 1952 |